(12) United States Patent
Hunter

(10) Patent No.: US 7,047,618 B2
(45) Date of Patent: May 23, 2006

(54) SINGLE STROKE O-RING INSERTION DEVICE

(75) Inventor: Michael Hunter, Bedford, NH (US)

(73) Assignee: Whitney Systems, Inc., Chelmsford, MA (US)

( * ) Notice: Subject to any disclaimer, the term of this patent is extended or adjusted under 35 U.S.C. 154(b) by 412 days.

(21) Appl. No.: 10/389,850

(22) Filed: Mar. 14, 2003

(65) Prior Publication Data
US 2004/0194277 A1    Oct. 7, 2004

(51) Int. Cl.
*B23P 11/02* (2006.01)
(52) U.S. Cl. .................. 29/450; 29/235; 29/229
(58) Field of Classification Search .......... 29/450, 29/451, 235, 229, 809
See application file for complete search history.

(56) References Cited

U.S. PATENT DOCUMENTS

| | | | | |
|---|---|---|---|---|
| 979,438 A * | 12/1910 | Courtney | .................. | 29/765 |
| 2,814,858 A * | 12/1957 | Erdmann | .................. | 29/229 |
| 3,137,932 A * | 6/1964 | Erdmann | .................. | 29/809 |
| 3,581,379 A * | 6/1971 | Drobilits | .................. | 29/450 |
| 3,605,239 A * | 9/1971 | Eschholz | .................. | 29/717 |
| 3,686,741 A * | 8/1972 | Williams et al. | .................. | 29/450 |
| 3,808,664 A * | 5/1974 | Jaquette | .................. | 29/235 |
| 3,827,124 A * | 8/1974 | Hervieux | .................. | 29/235 |
| 4,212,096 A * | 7/1980 | Saito et al. | .................. | 29/235 |
| 4,286,367 A * | 9/1981 | Geisinger | .................. | 29/235 |
| 4,532,706 A * | 8/1985 | Horn | .................. | 29/809 |
| 4,832,555 A * | 5/1989 | Gordon | .................. | 414/223.01 |
| 5,016,346 A * | 5/1991 | Gerst et al. | .................. | 29/754 |
| 5,392,505 A * | 2/1995 | Harada | .................. | 29/450 |
| 6,640,405 B1 * | 11/2003 | Ino | .................. | 29/229 |

* cited by examiner

*Primary Examiner*—David P. Bryant
(74) *Attorney, Agent, or Firm*—Davis & Bujold, P.L.L.C.

(57) ABSTRACT

An apparatus and method of applying an expandable member, such as an O-ring, to a part to from an installed part. The apparatus and method comprise a piston slidably positioned within a housing with a slidable sleeve interposed between the housing and the piston. The piston has an expandable member engagement surface on a leading end thereof. During operation, the expandable member is transferred from a holder to the exterior surface of the slidable sleeve. The slidable sleeve is then positioned sleeve about the part and relative movement of the housing with respect to the sleeve, transfers the expandable member from the sleeve and onto the part.

14 Claims, 12 Drawing Sheets

SINGLE STROKE O-RING INSERTION DEVICE

FIELD OF THE INVENTION

The present invention relates to an O-ring applicator, i.e., an application or insertion device for applying an O-ring to a separate part. In particular, the present invention utilizes a pressure driven piston mechanism to retrieve or pick an O-ring from a holder and apply or insert the O-ring onto, or into the O-ring groove of the separate desired part. The retrieval and application of the O-ring to the part is performed by the piston mechanism in a single linear motion of the piston mechanism in order to provide an efficient O-ring handling and application cycling to reduce the time necessary to produce volume O-ring applications.

BACKGROUND OF THE INVENTION

O-rings are commonly used to accomplish fluid sealing between different and varied structural features and machines. O-ring seals are conventionally installed on the inside or the outside of a cylindrical part and may be applied directly to a surface, and are sometimes retained in a groove on the surface. Such installation and positioning of O-rings is a particular problem especially where large numbers of such applications must be performed for efficiency and economies of scale.

While installations of O-rings in low volume applications can be done by hand or with known application mechanisms, where large quantities of such O-rings must be applied these known methods and devices are economically undesirable.

Some known devices use pistons and sleeves to install internal O-rings. In one device an O-ring is forced down inside of a tube causing it to emerge from the tube coincident with an internal groove. Another known device pushes the O-ring off a sleeve using a chamfered ram whereby the ram pushes the O-ring into the face groove. A still further known device involves specific geometry to interface with the head of a nuclear pressure vessel in order to speed up the installation of metal O-rings in a face groove.

None of these known devices retrieve or engage an O-ring and install it in a single motion. None of these devices use concentric pistons with an adjustable stop knob as will be discussed in further detail below. The ability to engage and apply an O-ring from a horizontal, flat condition and applying the O-ring in a single linear motion is not only critical to speeding up the application of the O-rings into the O-ring grooves, but also allows the use of many types of automatic O-ring feeders to be used in conjunction with the insertion device. Thus, such a process not only speeds up the O-ring application process but provides substantial manufacturing flexibility.

OBJECT AND SUMMARY OF THE INVENTION

Wherefore, it is an object of the present invention to overcome the above mentioned shortcomings and drawbacks associated with the prior art.

Another object of the present invention is to provide an O-ring insertion device which engages an O-ring and applies the O-ring to a separate part.

A further object of the present invention is to engage and apply the O-ring to the separate part in a single linear motion.

Yet another object of the present invention is to allow many types of automatic O-ring feeders to be used to feed O-rings in a lying flat or horizontal position to the present O-ring insertion device.

A still further object of the present invention is to apply the O-ring to the separate part via pressure actuated concentric pistons and a sliding sleeve The present invention also relates to an O-ring insertion device for applying an O-ring to a part, the O-ring device comprising a piston having an O-ring engagement portion; an O-ring holder having a piston insertion hole therethrough; a part holder spaced from the O-ring holder; and wherein the piston drives the O-ring engagement portion from an initial position through the piston insertion hole and into close proximity with the part holder, and returns the O-ring engagement portion to the initial position.

The present invention also relates to a device for applying an expandable member to a part, the device comprising a housing; a piston slidably positioned within the housing; a sleeve slidably interposed between the housing and the piston; the piston having a surface to facilitate transfer of the expandable member onto an outer surface of the sleeve; and wherein, when the piston and the sleeve are sufficiently retracted inside the housing, the housing forces the expandable member off the sleeve and onto the part.

The present invention also relates to a method of applying an expandable member to a part, the method comprising the steps of slidably positioning a piston within a housing; interposing a slidable sleeve between the housing and the piston; providing an expandable member engagement surface on the piston; transferring the expandable member from a holder to an exterior surface of the sleeve; positioning the sliding sleeve about the part; and moving the housing relative to the sleeve to transfer the expandable member from the sleeve and onto the part.

BRIEF DESCRIPTION OF THE DRAWINGS

The invention will now be described, by way of example, with reference to the accompanying drawings in which.

DETAILED DESCRIPTION OF THE INVENTION

Figure 1:
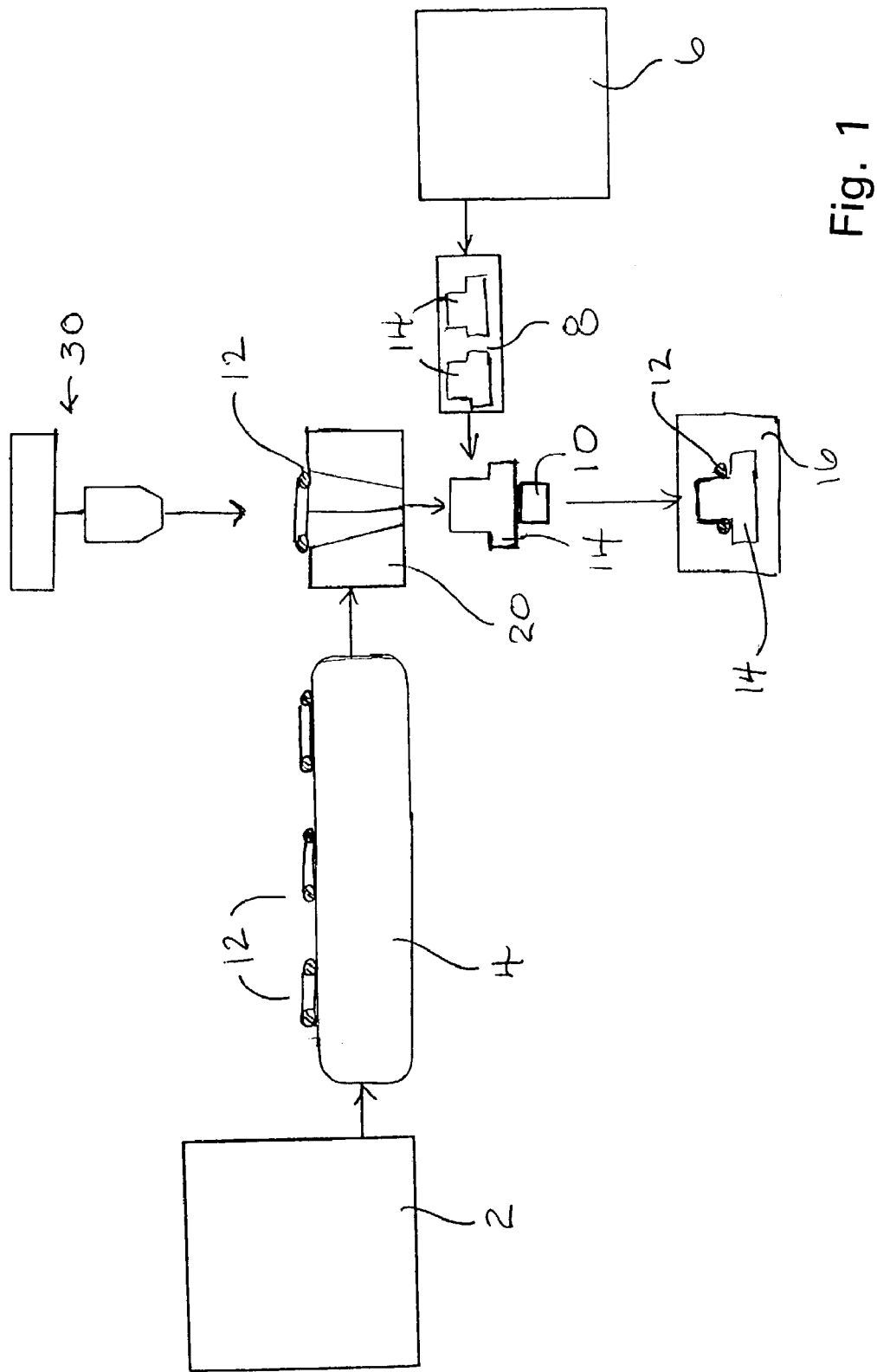
FIG. 1 is a diagrammatic view of the O-ring installation system and insertion device according to the present invention.

Turning now to FIG. 1, a diagrammatic representation of an exemplary O-ring insertion system will first be described in general. In order to produce the most efficient application of a O-ring, or some other expandable member, to individual parts, a bulk O-ring bin 2 is provided for holding a plurality of individual O-rings, i.e., from one or two to several thousand or more O-rings 12. The bin 2 communicates with a conventional transport mechanism or conveyor 4, which can be of any type known in the art, for example, a conveyor belt, or manipulating arm which supplies the O-ring to an O-ring holder 20. The holder 20 holds and aligns the O-ring adjacent and above a part holder 10 supporting an individual part 14 to which the O-ring 12 is to be applied.

Similarly, a bulk part bin 6 holds and stores a plurality of individual parts 14 and supplies the individual parts 14 to the part holder 10 via a conventional parts transport mechanism or parts conveyor 8, which, as described above with respect to the conveyor 4 can be a conveyor belt, or a manipulating arm as is known in the art. The individual parts 14 are supplied to the part holder 10 which is generally spaced a small distance from but located adjacent and in a vertical alignment with both the O-ring 12 and the O-ring holder 20. This alignment allows the O-ring 12 to be applied in a single vertical linear stroke of the insertion device 30 which will be described in greater detail below. It should be noted that the part 14 and the O-ring 12 could be concentrically aligned along a stroke axis at virtually at any angle, e.g., the part 14 could be supplied above the O-ring 12 or both components could lie in a horizontal plan. In either event, the insertion device still applies the O-ring to the part 14 by a single insertion stroke. As such arrangements would be well within the skill of those in the art a further discussion is not provided. The above general description is by way of example as one or more of the operations, such as the placing of the O-ring and placing the part could also be performed manually.

Once the part holder 10 is provided with a part 14, and the O-ring holder 20 is provided with an O-ring 12, the insertion device 30, to be described in further detail below, engages the O-ring 12, expands and supports the O-ring 12 and finally applies the O-ring 12 in a single-stroke motion to the part 14. Thereafter, the insertion device 30 then resets itself back to its initial position so that it is ready to apply a subsequent O-ring 12 to a subsequent part 14. Simultaneously therewith, the combined O-ring 12 and part 14, i.e., a completed product, is conveyed from the part holder 10 to an inspection station 16 where the completed product is inspected, if desired or necessary, and any malinstalled completed parts may be rejected. In the meantime while the insertion device 30 is retracting, air pressure or spring force causes the insertion head to expand, and a subsequent part 14 and subsequent O-ring 12 are supplied from the respective bulk bins 2 and 6 via conveyors 4, 8 to the holders 10, 20, or manually, to continue the manufacturing process. It is to be appreciated that different feeder systems accomplishing the same tasks as bulk O-ring bin 2 and bulk part bin 6 and conveyors 4, 8 are well known in the industry and alternatively may be used to supply the respective O-rings 12 and parts 14 to the holder 10,20.

Figure 2B:
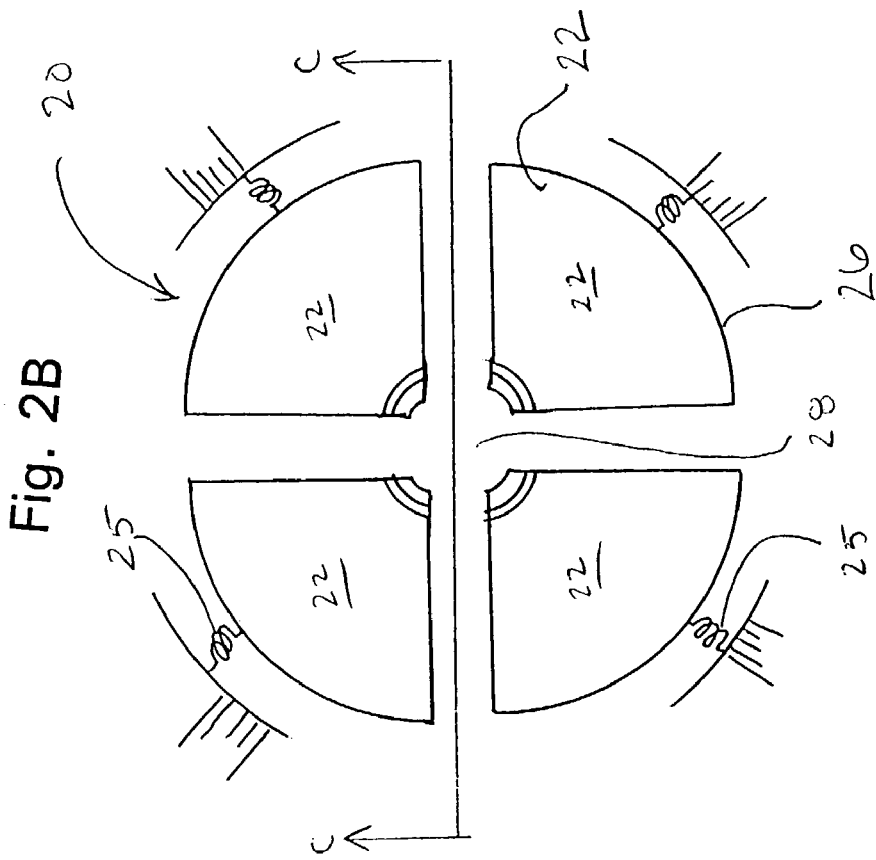
FIGS. 2A and 2B are top plan views of the O-ring holder showing the O-ring holder in its biased closed position and an opened position, respectively.
Figure 2A:
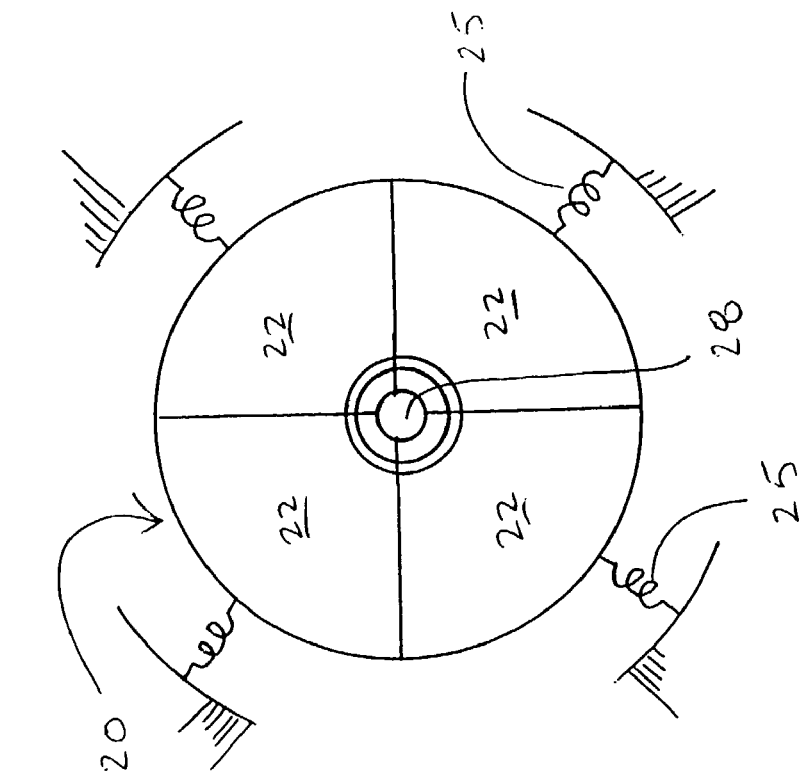
Figure 2C:
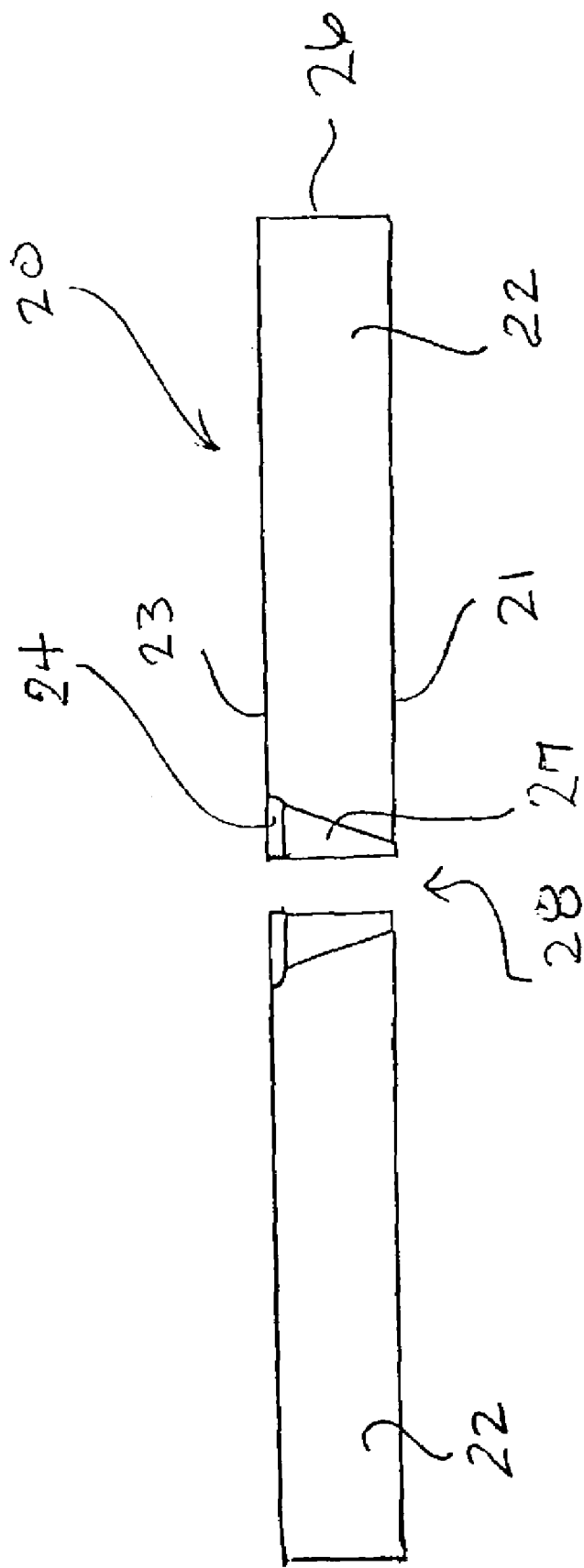
FIG. 2C is a cross-section of the O-ring holder in an unopened position.

Turning to FIGS. 2A, 2B and 2C, a detailed description of the O-ring holder 20 is now provided. The O-ring holder 20 is an expandable plate or platform comprising of a number of separable O-ring holder jaws or sections 22. Each section 22 is in essence a "pie slice" of the O-ring holder 20 which, when pieced together with one another, form the shape of a complete circle or a disk having opposed top and bottom surfaces 21 and 23, and an outer edge 26 defining a desired profile, e.g., circular, as shown, although any profile shape can be utilized envisioned. Each section 22 is biased radially inwardly by an elastic or spring-type device 25 into an initial position, as shown diagrammatically in FIG. 2A. It is to be understood that the sections 22 of the holder 20, as shown in FIGS. 2A–2C, could be inwardly biased in any forceful manner, for instance, by a circumferential spring, elastic device or band circumscribing the outer perimeter or edge of the holder 20, or by a plurality of individual compression springs 25, e.g., one spring for each section 22 as shown in FIG. 2A. Any actuator, even pneumatic pressure means, could be used to retractably force the sections 22 together. As different methods of spring biasing the sections 22 radially inward with respect to one another are well known in the art, no further discussion concerning the same is provided.

The inwardly biased O-ring holder 20 defines a central tapering O-ring hole 28 extending completely therethrough, although the O-ring hole 28 may not require a taper in certain applications. In the initial position of the sections 22, each section 22 of the holder 20 is biased into engagement with the two immediately adjacent sections 22 so that the tapering O-ring hole 28 has a diameter generally smaller than the diameter of the O-ring to be installed or applied. When the O-ring hole 28 is forced open or enlarged, i.e., where the sections 22 are sufficiently separated from one another as shown in FIG. 2B for example, the diameter of the tapering O-ring hole 28 expands so as to permit passage of at least a leading portion of the insertion device 30, as well as the supported O-ring 12, therethrough and thereby facilitate application of the O-ring 12 to the part 14 located beneath the holder 20 as described below in further detail. The passage of the O-ring 12 and the insertion device 30, including in many cases the housing of the device, through the O-ring hole 28 is facilitated by the above discussed inwardly biased sections 22 of the holder which expands as a result of the downward force applied by the insertion device 30 thus providing a radial outward expansion force on the holder sections 22, which is opposite to the spring biased radial inward force. The radial outward expansion force exerted on the holder sections 22, by the insertion device 30, enlarges the diameter of the O-ring hole 28 from the initial position, as shown in FIG. 2A, to an expanded or enlarged position as shown in FIG. 2B.

As shown in FIG. 2C, an O-ring groove 24 is formed on the top surface of the holder 20 and this groove circumscribes the O-ring hole 28. The O-ring groove 24 provides an axial and radial seat for supporting the O-ring 12 in a manner so that the O-ring lies in a plane extending perpendicular with respect to insertion motion of the insertion device 30. The O-ring groove 24 has a diameter slightly larger than the O-ring 12 to permit seating of the O-ring within the groove 24. The O-ring groove 24 mates with a tapering section which tapers downward along O-ring hole walls 27 to a narrower diameter opening at the opposing end of the O-ring hole 26 on the bottom surface 21 of the holder 20.

It is important to note that in the initial position of the sections 22, as shown in FIG. 2A, an O-ring 12 will be seated in the O-ring groove 24 at a precise position so that it may be readily engaged with the insertion device 30 and thereafter applied too the individual part 14. When the O-ring 12 is engaged and supported by the insertion device 30, the O-ring 12 and insertion device 30 are pushed through the O-ring hole 28 and tapering hole 27 thereby forcing the sections 22 of the holder 20 radially outward from their initial positions and thus forcing the sections 22 into their expanded positions and increasing the diameter of the O-ring hole 28 so as to allow passage of the O-ring 12 and insertion device 30 therethrough.

FIGS. 2B and 2C detail the enlarged position of the O-ring holder 20 via the separation of the O-ring sections 22 to allow passage of the insertion device 30 and the O-ring 12 through the O-ring hole 28. As will be apparent to a person of ordinary skill in the art, once the O-ring 12 has been applied to the part 14, the insertion device 30 is withdrawn from the O-ring hole 28 and the individual O-ring holder sections 22 are inwardly biased back into the initial position as shown in FIG. 2A in order to receive a subsequent O-ring the holder groove 24 and continued application of O-rings 12 via the insertion device 30, to subsequent parts 14.

The holder 20 may be divided into any number of holder sections or jaws 22. For example, the holder 20 may be only as two mating halves, or alternatively 3 or more sections, the preferable number in the present invention is four (4) sections or jaws 22 which minimize the complexity of the holder 20 while providing sufficient force to support or push the O-ring up the taper of the nose piston to the extent necessary to properly engage the O-ring.

Figure 3:
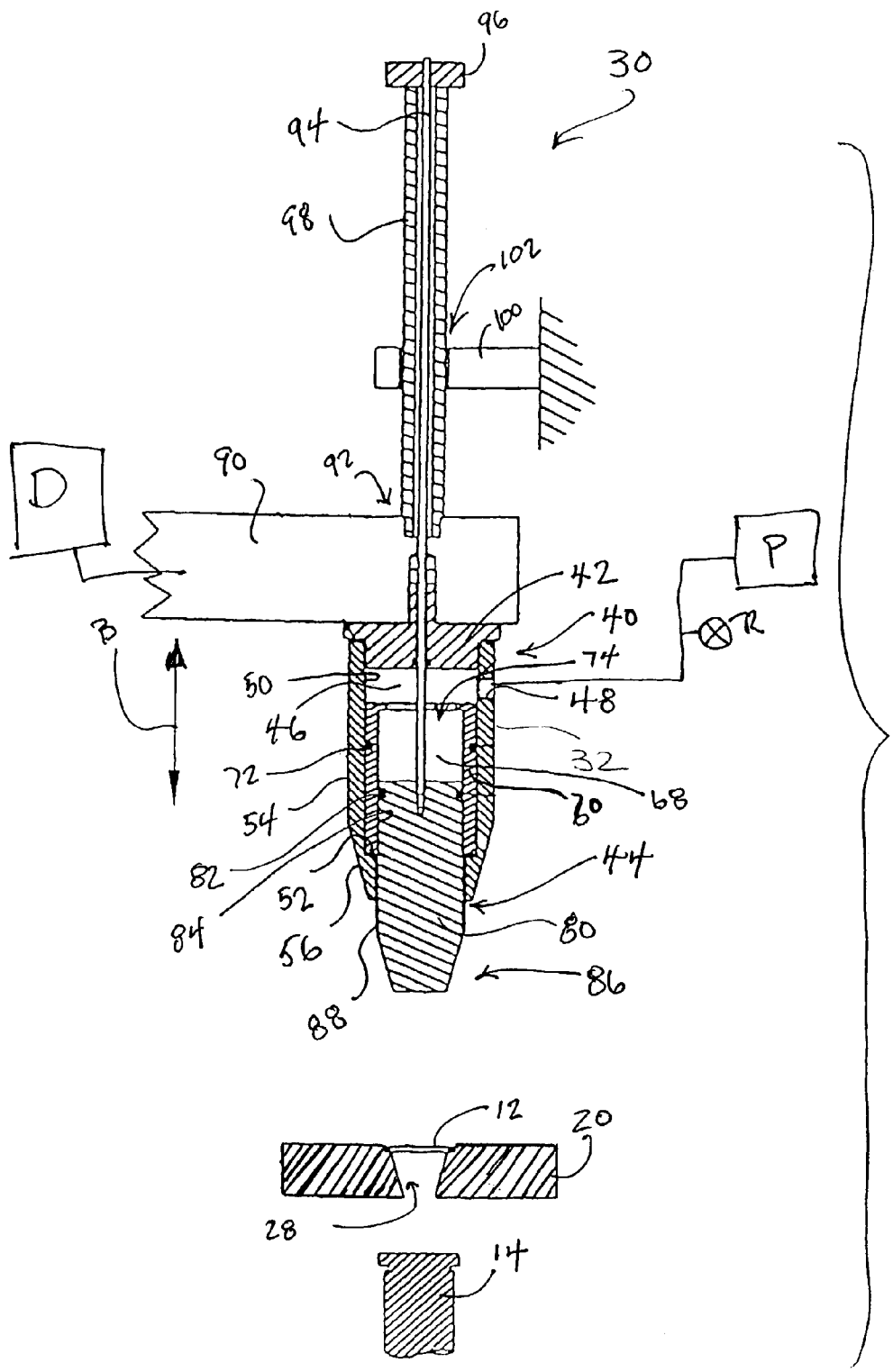
FIG. 3 is a cross-sectional view of the insertion head, O-ring holder, O-ring and part.

Observing FIG. 3 a detail description of the insertion device 30 is now provided. An insertion head 30 comprises a piston housing 40 and two concentric pistons, an outer sleeve piston 60 and an inner nose piston 80. The piston housing 40 is generally cylindrical and supported at a first end by a base portion 42 connected to a movement arm 90, and a second end defining a piston housing opening 44. The piston housing 40 defines an interior housing cavity 46 into and out of which the outer sleeve piston 60 and the inner nose piston 80 are slidably retracted and extended through the piston housing opening 44.

The piston housing 40 is further provided with an air port 48 through which pressurized air is supplied to the interior housing cavity 46 to push, i.e., actuate, the sleeve piston 60 and the nose piston 80 out of the interior housing cavity 46 and at least partially through the housing opening 44. Instead of air pressure a spring (not shown) could also be used to provide the appropriate biasing force within the housing cavity 46. An inner wall 50 of the piston housing 40 includes a restraining ledge or lip 52 spaced from, but near the housing opening 44 and arranged circumferentially around the piston housing inner wall 50. An outer wall 54 of the piston housing 40 is provided with a sloped end portion 56 which can be substantially the same or different taper or slope as that of the tapered O-ring hole 28 of the O-ring holder 20 to facilitate passage of the piston housing 40 therethrough. This slope is generally between 10 and 60 degrees, however different applications can require slopes of different angles.

Figure 4:
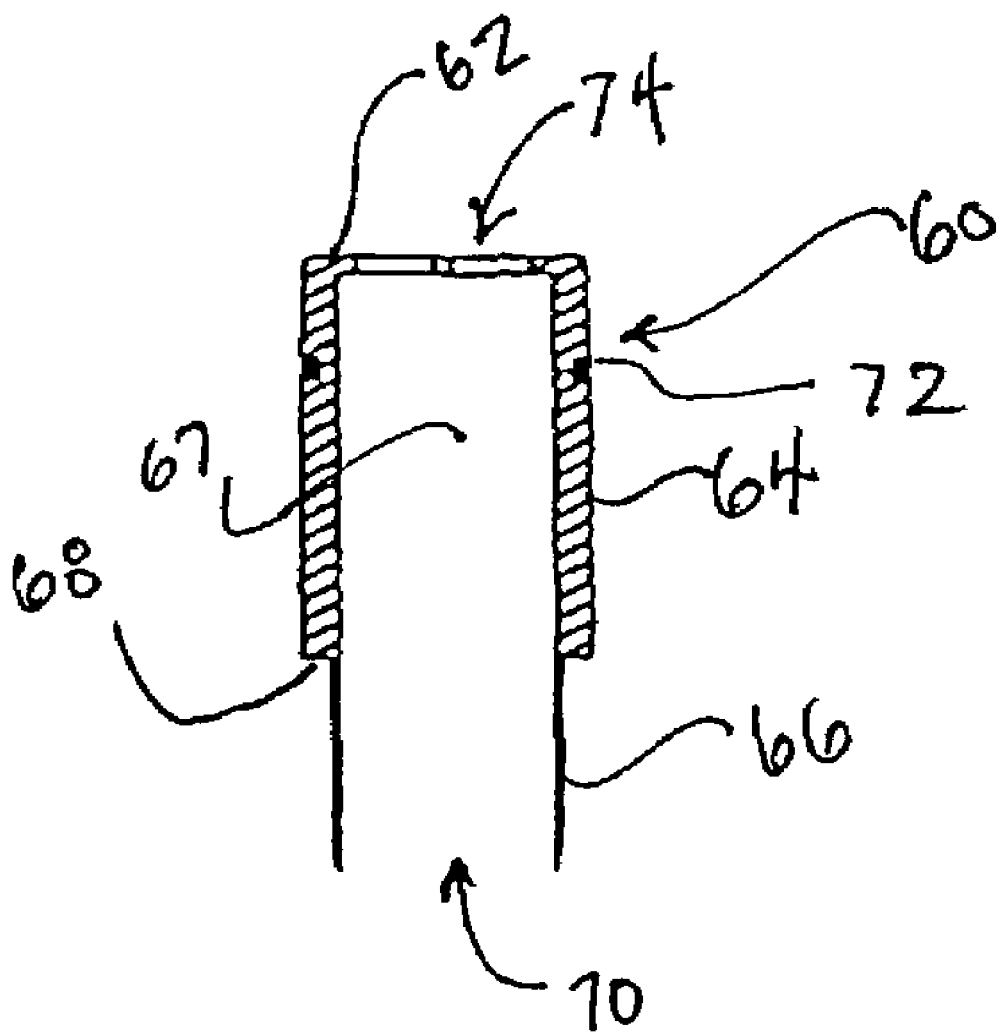
FIG. 4 is a cross-section view of the sleeve piston.

The sleeve piston 60 is slidably situated or nested within the interior housing cavity 46 of the piston housing 40 and supported adjacent the inner wall 54 of the piston housing 40. As shown in FIG. 4, the sleeve piston 60 comprises at a first end a sleeve piston base 62 attached to a main body portion 64. The main body portion 64 is attached to a thin-walled sleeve portion 66 and at the point of attachment therewith, a circumferential engaging edge 68 is formed on the outside surface 84 of the sleeve piston 60 due to the transition in thickness of the main body portion 64 and the thin walled section 66. The sleeve piston 60 also defines an interior sleeve cavity 67 and a sleeve piston opening 70 at a second end of the sleeve piston 60 specifically defined by the termination of thin wall sleeve portion 70.

The nested and slidable relationship between the piston housing 40 and the sleeve piston 60 is such that when the sleeve piston 60 is inserted appropriately in the housing, for example by removing the housing base portion 42 and slidably inserting the sleeve piston 60 through the first end of the housing, the engaging edge 68 at the intersection between the main body portion 64 and the thin-walled sleeve portion 66 creates a stop which engages the restraining lip 52 of the housing and thus acts as a stop which retains the sleeve piston 60 substantially within the piston housing 40. An annular sleeve piston seal 72 is also provided between the main body of the sleeve piston 60 and the inner wall 50 of the piston housing 40 to provide pressurized seal between those two elements.

As is further explained in detail below with respect to operation of the device, although the sleeve piston 60 is always retained within the piston housing 40 via the restraining lip 52, at least a portion of the thin-walled sleeve portion 66 can be partially exposed from the housing opening 44 when desired by pressurizing the interior housing cavity 46 to force and extend at least part of the thin walled portion 66 of the sleeve piston 60 out through the piston housing opening 70. The thin-walled portion 66, although slightly larger, is very close in diameter to the nose piston 80 to facilitate transfer of the O-ring onto the thin walled portion of the sleeve piston 60. In addition, the opening into the sleeve piston 60 is at least slightly larger than a portion of the part 14 to which the O-ring is to be applied, and as such the thin-walled portion 66 must extend at least slightly beyond the piston housing opening 44 in order to appropriately engage, and disengage or shed, an O-ring 12 as will be described in greater detail below.

Returning FIG. 4, the nose piston 80 is generally slidably situated within the interior cavity 67 of the sleeve piston 60. A second annular seal 82 is located between the sleeve piston inner wall 50 and an outer surface 84 of the nose piston 80 so that the nose piston 80 can be slidably moved relative to the sleeve piston 60 due to pressurized air introduced into the interior sleeve piston cavity via a communicating passage 74 with the interior housing cavity through the sleeve piston base 62. This enables pressurized air supplied to the interior cavity of the housing to enter into the interior sleeve piston cavity between the sleeve piston 60 and the nose piston 80, thus slidably extending the nose piston 80 relative to the sleeve piston 60 and out the sleeve piston opening 70 and at least partially beyond.

The nose piston 80 is provided with a substantially sloped or tapered nose tip 86 of between about 10 degrees and 60 degrees, although different angles may be utilized, for assisting in the initial engagement of the O-ring 12 as well as for passing through the tapered O-ring hole 28 in the holder 20. The nose piston 80 may be provided with about the same slope or taper as the O-ring hole 28. When the nose piston 80 initially engages with an O-ring 12, the sloped or tapered nose tip 86 of the nose piston 80 initially partially passes through an opening of the O-ring 12 and initiates expansion of the holder sections. The nose piston 80 is retained in the sleeve piston 60, i.e., maintained from completely extending from the sleeve piston 60 and falling out, by a stop rod 94 and stop collar 96. The maximum extension of the nose piston 80, i.e., the longitudinal linear control of the nose piston 80, is further controlled according to a stop rod 94 and the relationship between an actuator arm 90, a fixed arm 100, the stop collar 96 and a hollow stop shaft 98, each of which will be described in further detail below.

While engaging with the O-ring 12, the nose piston 80 is extended relative to the sleeve piston 60 to the extent that the opening of the sleeve piston 60 which is defined by a leading edge of the thin walled sleeve portion 66, is located substantially adjacent a transition point 88 on the surface of the nose piston 80 where the sloped tip 86 transitions to a cylindrical wall. As the O-ring 12 is forced or pushed up the exterior tapered tip 86 of the nose piston 80, the O-ring 12 is eventually forced onto and over the thin walled sleeve portion 66 of the sleeve piston 60 once the O-ring 12 reaches the transition point 88. Thereafter, the O-ring 12 is conveyed to the part 14 for insertion, a further description of which will be provided below.

Thus, as should be apparent to those of skill in the art the structural aspects of the insertion head 30 as described above include a pressure driven, telescoping piston-type device which in conjunction with the linear motion provided by an actuator arm 90 to which the housing 40 is attached, provides the totality of linear motion of the insertion head 30 for engaging and applying the O-ring 12.

The actuator arm 90 to which the insertion head 30 is affixed is linearly movable as shown by arrow B by a drive device D, for example a motor drive, a pressure drive or any other type of conventional drive device, as is well known in the art, and is, therefore, shown only diagrammatically. The drive device D is essentially a prime mover which cooperatively with a pressure supply P providing pressurized air, or some other fluid, to the cavities in the insertion head 30.

The actuator arm 90 is provided with a passage 92 which extends through the actuator arm 90 and permits a stop rod 94, described in further detail below, to extend between a stop collar 96 located on one side of the actuator arm 90, and the nose piston 80 located on the opposite side of the actuator arm 90. At least a portion of the passage may have different bore diameters and can even be threaded to affix the base of the housing on one side and stop shaft encompassing the stop rod 94 on the opposing side of the actuator arm 90. At a minimum, the passage has a diameter at least slightly greater then the stop rod 94 to permit relative axial movement of the stop rod 94 within the passage 92.

The hard stop device comprising the above features and explained in further detail below, is essentially a passive device which generally controls and limits the downward linear motion of the nose piston 80 relative to the actuator arm 90 and the insertion head 30. The stop rod 94 extends between the nose piston 80 at a first end, through the passage of the actuator arm 90 and is affixed to the stop collar 96 on a second end of the stop rod 94. A hollow stop shaft 98 which axially encompasses the stop rod 94, is attached at a first end to the actuator arm 90, and the opposite free end engages with the stop collar 96. The stop rod 94 extends through the hollow stop shaft 98.

The hollow stop shaft 98 is permanently fixed to the movable arm 90 and is essentially a pipe or cylinder surrounding the inner stop rod 94. The inner stop rod 94 and the outer stop shaft are slidable relative to one another to thus control the operation of the inner nose piston 80 in conjunction with the stop collar 96. The stop collar 96, since it is attached to the stop rod 94 provides a limit to the downward movement of the nose piston 80 by encountering the second end of the stop shaft which stops further extension of the stop rod 94 and, in turn, the nose piston 80 fixed to the opposing first end of the stop rod 94.

Figure 7:
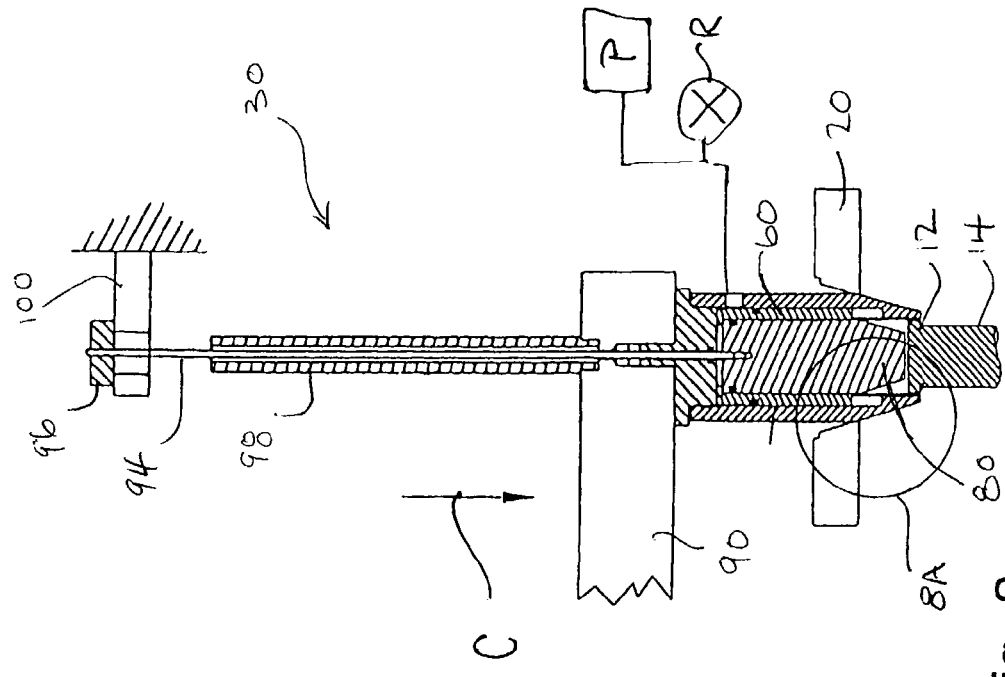
FIGS. 7 and 7A details the extension of the sleeve piston beyond the O-ring holder.
Figure 8:
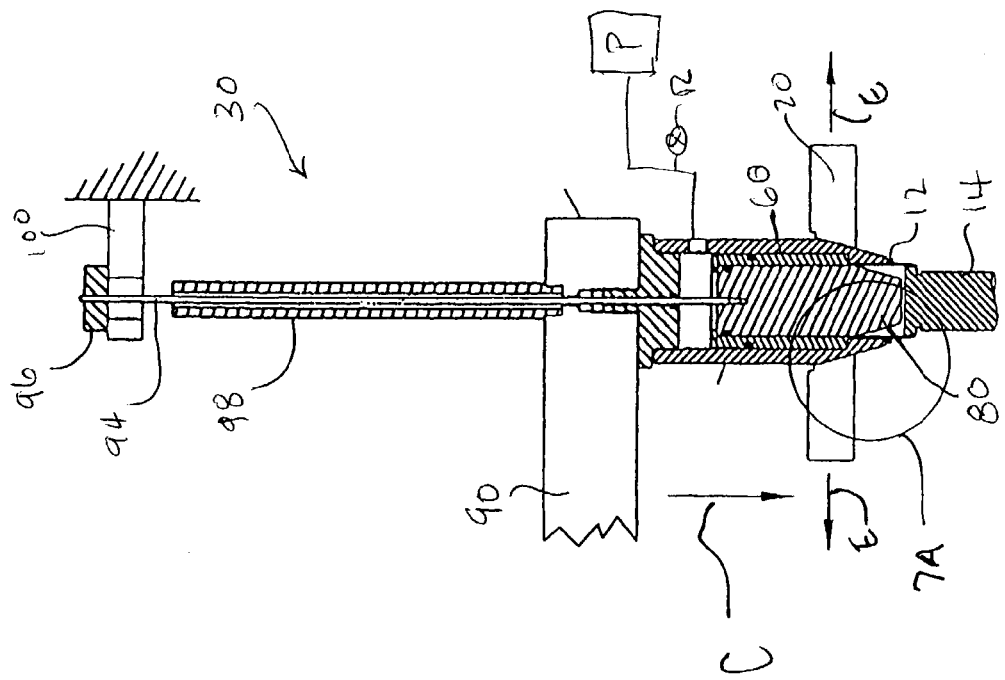
FIGS. 8 and 8A shows the full extension of the actuator arm and the final application of the O-ring to the part.

Besides having one end affixed to the actuator arm 90, the stop shaft 98 is slidably situated within a stationary or fixed arm 100 housing a hole 102 through which the stop shaft 98, and thus the stop rod 94 as well, extend. The fixed arm 100 slidably supports the stop shaft 98 and the stop rod 94 between the respective stop collar and the actuator arm 90. The hole 102 has a diameter sufficient to permit slidable movement of the stop shaft 98 therein, however, the diameter is less than that of the diameter of the stop collar 96. Thus, even when the stop shaft 98 is withdrawn through or past the fixed arm, as shown in FIGS. 7 and 8, the stop collar 96 as well as the stop rod 94 to which it is affixed cannot pass therethrough. This function, as will be described in greater detail below, causes downward motion of the nose piston 80 to be limited and facilitates application of the O-ring 12 onto the desired part 14.

The following description of the operation of the above described device will provide further explanation and clarity relative to the structure and function of the various element and components of the present invention. The description below follows FIGS. 3 and 5–8 in sequence. FIGS. 5A–8A are exploded views showing the interrelationship of the O-ring 12 and the piston of FIGS. 5–8.

As shown in FIG. 3, initially the O-ring feeder system and part feeder provide an O-ring 12 and part 14 to the respective holders 20, 10. By way of example, the O-ring 12 may be positioned in the groove 24 of the O-ring holder 20 in a substantially horizontal or flat relationship relative to a vertical linear motion of the housing 40, sleeve piston 60 and nose piston 80.

The actuator arm 90 and the insertion head 30 are arranged in an initial position with the actuator arm 90 positioned relatively near the fixed arm 100 and the insertion head 30 spaced from the O-ring 12 and the holder 20. Pressurized air or other fluid is introduced into the cavity 46 of the piston housing 40 through the port 48 to extend the sleeve piston 60, shown by arrow C in FIG. 5, to a point where the engaging edge 68 of the sleeve piston 60 abuts the restraining lip 52 on the inner wall 50 of the piston housing 40. The pressurized fluid also infiltrates into the interior cavity 67 of the sleeve piston 60 thus also extending the nose piston 80 relative to the sleeve piston 60 and piston housing 40 until the extension is stopped via the stop rod 94 by the abutting of the attached stop collar 96 on the second end of the stop shaft. Thus, the insertion head 30 is in a fully extended position with the extension or outward linear motion of the nose piston 80 restrained by the stop collar 96, which abuts against the stop shaft and the sleeve piston 60, in turn, is restrained by the lip 52 on the inside wall of the housing 40. As shown by the arrow B, from the initial position the drive device D also moves the actuator arm 90 away from the fixed arm 100 bringing the extended insertion head 30 towards the O-ring 12 and holder 20.

Figure 5:
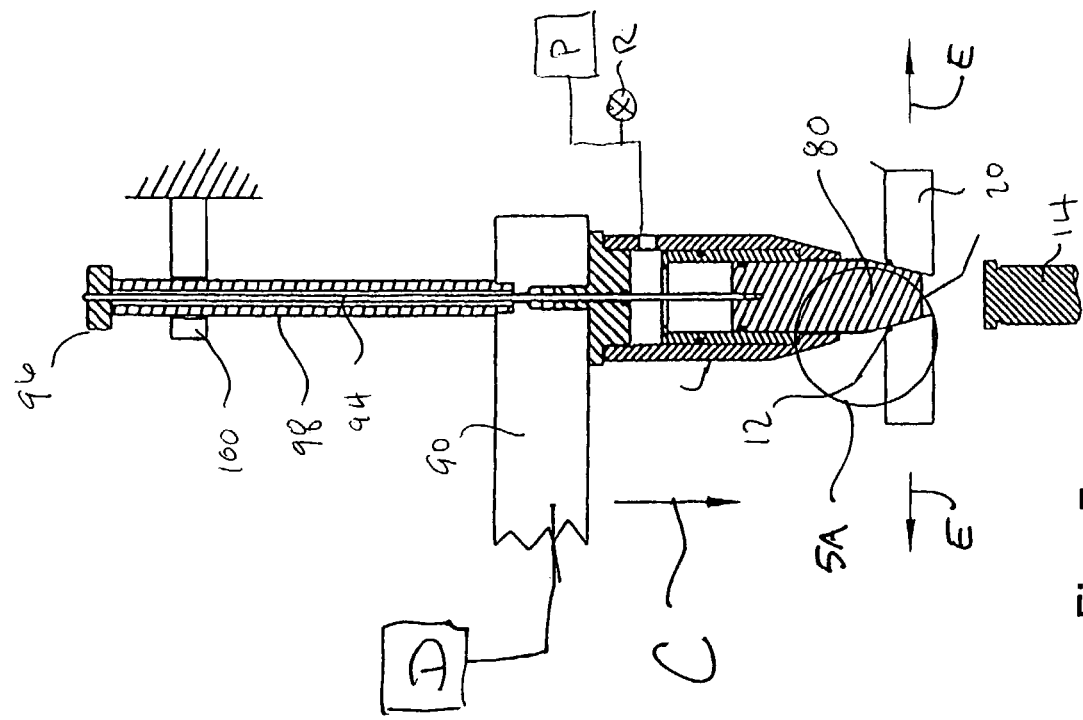
FIGS. 5 and 5A shows an initial linear motion and engaging of the horizontally aligned, flat O-ring by the insertion device.
Figure 5A:
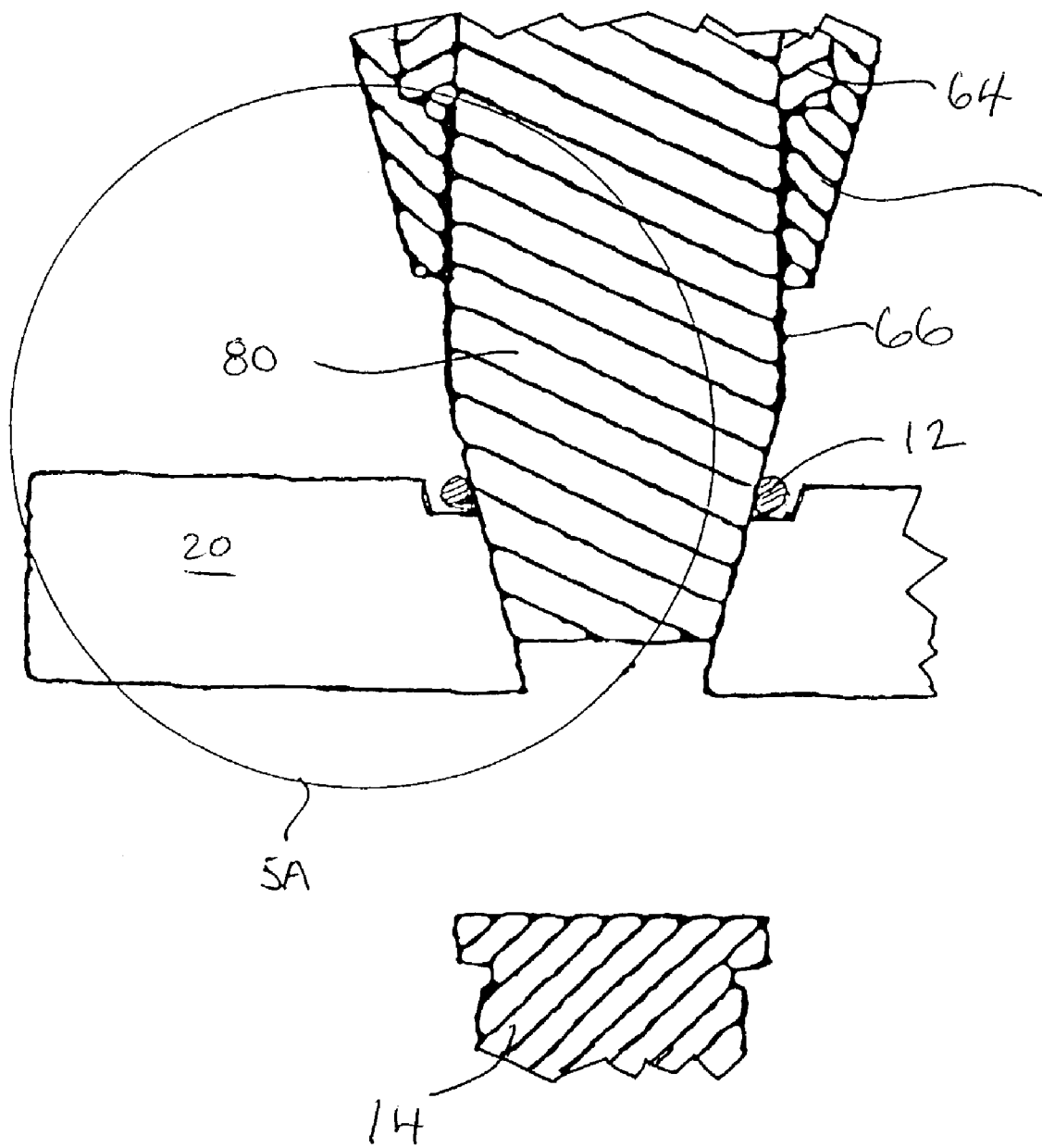

With reference to FIG. 5, with the drive device D actuated, and insertion head 30 extended, the actuator arm 90 carries the extended insertion head 30 linearly and axially towards the O-ring 12. As the actuator arm 90 moves towards the O-ring 12 and away from the fixed arm 100, the stop rod 94 and shaft slide together through the hole 102 in the fixed arm 100. The nose piston 80, axially centered on the O-ring 12, enters and passes through an opening of the horizontal O-ring 12, and also into the O-ring hole 28 in the holder 20. The tapered or sloped tip 96 of the nose piston 80 goes through the opening in the O-ring 12 and, as the sloped tip 96 gradually engages the inner circumference of the O-ring 12, acts to expand the O-ring 12 axially against the holder 20 thus forcing the O-ring 12 to roll, ride up or slide along the tapered outside diameter of the nose piston 80 and expand in diameter as shown in FIG. 5A. As shown by the arrows E, as the nose piston 80 engages the O-ring 12 at substantially the same time the sections of the holder 20 are also forced radially outward thus enlarging the hole 28 to permit passage of the O-ring 12 and at least a portion of the insertion head 30.

Figure 6:
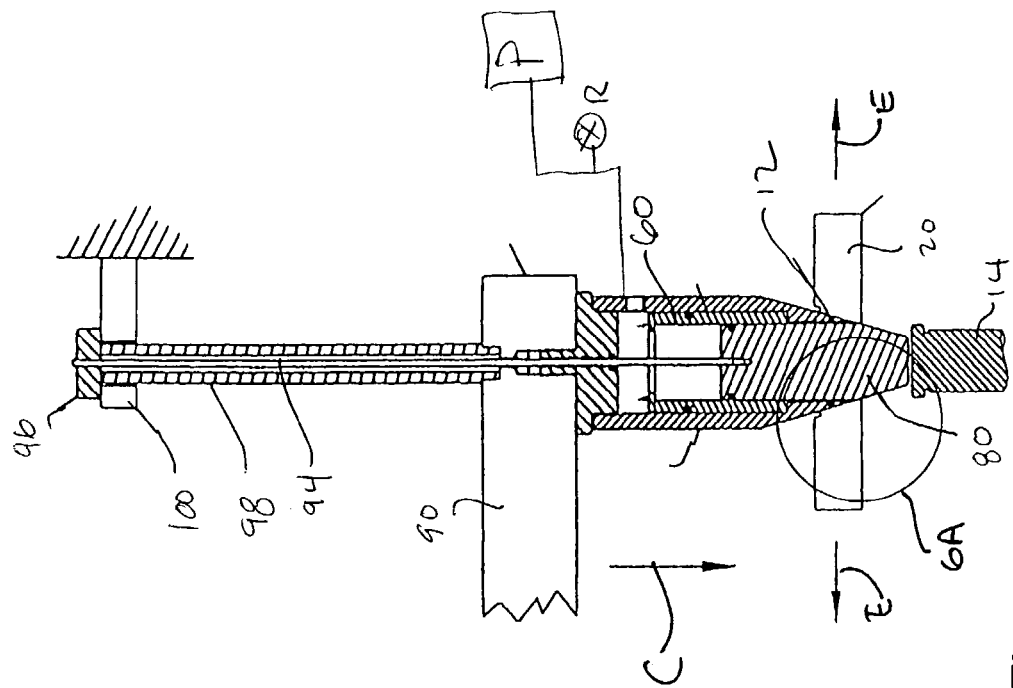
FIGS. 6 and 6A shows a second position of the insertion device wherein the stop collar has engaged the fixed arm stopping the innermost of the concentric pistons.
Figure 6A:
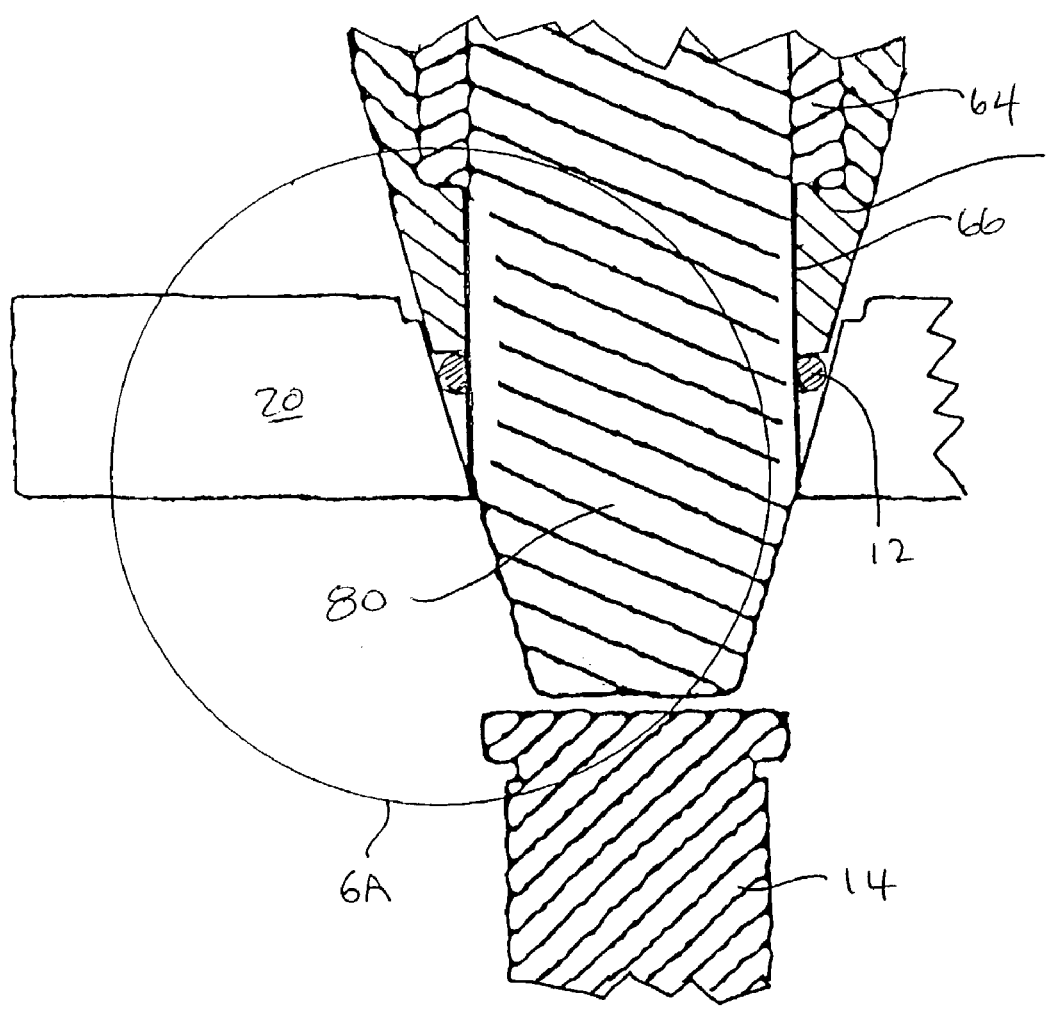

Observing FIGS. 6 and 6A, as the insertion device 30 moves further vertically linearly with respect to the holder 20 and O-ring 12, the O-ring 12 is continued to be rolled, ride, slide and/or forced up and completely over and past the tapered tip 86 of the nose piston 80 and onto the exterior surface 84 of the thin-walled end 66 of the sleeve piston 60. The O-ring 12 is now deposited, i.e., located on and supported on the thin walled sleeve portion 66, either on the outer surface thereof or in a groove (not shown) formed on the thin walled portion 66 of the sleeve piston 60, and is positioned just below or adjacent the opening of the piston housing 40.

Once the O-ring 12 has been deposited on the sleeve piston 70 and the extended portion of the nose piston 80 has passed through the hole 28 in the O-ring holder 20, and the sloped portion 56 of the piston housing 40 commences engagement with the sloped walls of the hole 28 in the holder 20 and further expands the diameter of the O-ring hole 28. Once this occurs, the nose piston 80 may now be stopped, or possibly retracted, in order to facilitate the subsequent application of the O-ring 12 to the part 14. It should be noted that the nose piston 80 does not contact the part 14 to which the O-ring 12 is to be applied. Prior to contact with the part 14, the linear motion of the nose piston 80 is halted by the stop rod 94 due to the stop collar 96 affixed abutting against the fixed arm 100. However, as is described below the remainder of the insertion device 30 continues its downward motion relative to the nose piston 80.

Figure 7A:
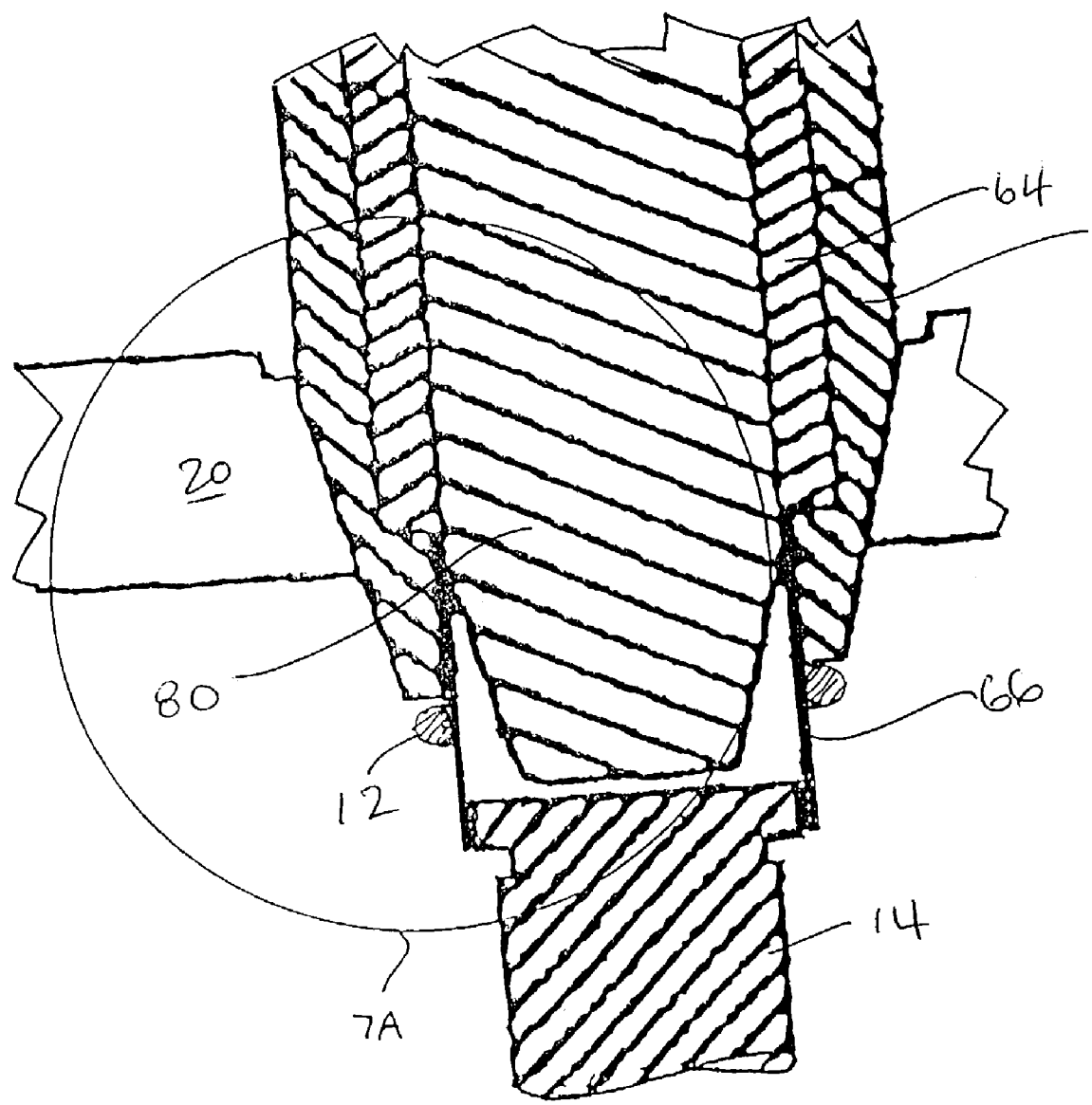

The O-ring 12 which is currently supported on the thin walled sleeve portion 66 of the sleeve piston 60 is carried through and past the holder 20 as shown in FIGS. 7 and 7A, while still being supported on the thin walled portion 66. The holder sections 20 continue to separate and expand to permit passage of the larger sleeve piston 60 supporting the O-ring 12 as well as the sloped end portion 56 of the piston housing 40, as the insertion head 30 is driven by the actuator arm 90 and the drive device D toward the part 14 in the part holder 10. The first end of the hollow stop shaft 98 which merely abuts with the stop collar 96, begins to separate therefrom and continues to move linearly with the actuator arm 90. Despite the stop rod 94 and, in turn, the being prevented from further downward linear movement, the stop shaft slides relative to the stop rod 94 held by the stop collar 96 and fixed arm 100 as the actuator arm 90 continues linear motion shown by arrow C.

As the insertion head 30 reaches the part 14 and partially engages the part 14 to which the O-ring 12 is to be applied, the part 14 is at least partially encompassed by the second interior cavity through the sleeve piston opening. Recognizing that at approximately the same time, the nose piston 80 which is of course linearly fixed by the stop collar 96, relative to the still moving sleeve piston 60 and housing 40, is essentially retracted within the sleeve piston cavity 62. The sleeve piston 60 bottoms out on the base of the nose piston 80 and such engagement thus stops further downward linear movement of the sleeve piston 60 and the O-ring 12. The sleeve piston 60 is thus linearly stopped in a position wherein the sleeve piston 60 opening is aligned substantially adjacent the portion of the part 14 to which the O-ring 12 is to be applied.

Figure 8A:
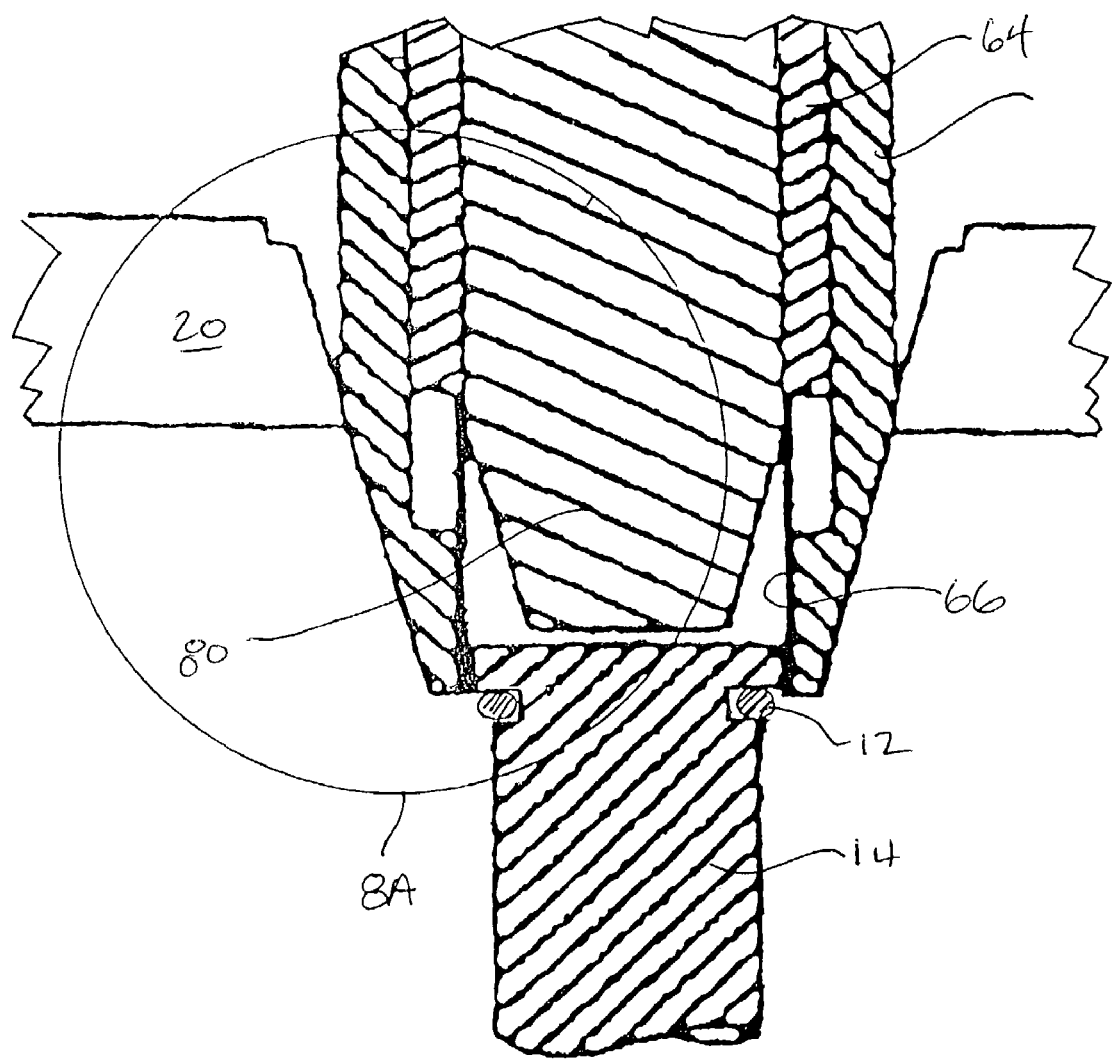

Understanding that the piston housing 40 carried by the actuator arm 90 still continues to move linearly toward the part 14 relative to the now linearly fixed sleeve and nose pistons 60 and 80, the piston housing 40 now acts as an O-ring remover or stripper. The circumferential engaging edge 68 of the piston housing opening 44 now slides relative to the exterior surface of the stationary sleeve piston 60 and pushes the O-ring 12 along the thin walled portion 66 of the sleeve piston 60 towards the end of the thin walled portion 66 adjacent the sleeve piston opening. The front edge of the piston housing 40 pushes the O-ring 12 over and off the thin walled section 66 adjacent the portion of the part to which the O-ring 12 is to be applied. Thus, the O-ring 12 is transferred and applied to the portion or groove 24 on the part 14 on the desired portion of the assembly part as shown in FIGS. 8 and 8A.

Once the piston housing 40 has transferred or pushed the O-ring 12 onto the part 14, the piston housing 40 also bottoms out on the stationary nose 80 and sleeve piston 60. Thus the entire insertion head 30 and actuator arm 90 are completely stopped by the stop collar 96 which is in abutting engagement with the fixed stop arm 100. Next, the air pressure supplied to the cavities is exhausted through the port 48 and a regulator R during the above described sequential telescoping collapse of the pistons into the piston housing 40.

The single linear motion of the insertion device 30 is now completed and the final position of the insertion head 30 relative to the initial position is attained with the O-rings 12 applied to the part 14. The drive D then reverses the motion of the actuator arm 90 to return the insertion head 30 back to its initial position for a subsequent insertion cycle. To fully complete the cycle, the insertion device 30 is returned from the second final position to the initial position and the concentric pistons are re-extended by the regulated air pressure supplied inside the housing 40 as previously discussed. Upon complete retraction of the piston housing 40 to its initial position, the four jawed O-ring holder 20 is also returned backed to its original position by the springs 25 or other type of biasing device.

The completed part, with the attached applied O-ring 12, is removed from the part holder 20 by either manual or mechanical means known in the art and may be inspected by conventional inspection equipment. While this occurs, a subsequent O-ring 12 and part 14 are fed to the respective holders 20 to facilitate another insertion cycle 1.

The actuator arm 90, which moves the insertion device 30 up and down, can be replaced by a hollow rod air cylinder or any other actuator that is capable of the described motion. There are three adjustments for vertical location of various parts of the device. The initial relative position between the nose piston 80 and the sleeve piston 60 may be adjusted up or down along the stop rod 94 by threading the stop collar 96. The stop collar 96 may also be a clamp collar and fastened onto the stop rod 94 in this manner. Another adjustment of vertical location could possibly be the location of the fixed arm 100. This would keep it from contacting the part 14 onto which the O-ring 12 is to be installed. The final vertical adjustment would be the stop location of the actuator arm 90. The means of this adjustment would vary, depending on the type of actuator used, but it is important in that it provides the final push of the O-ring 12 into its destination groove, recess or other desired location.

The taper of the nose piston 80 should be equal to or less than 60 degrees. A larger taper increases the axial force required to expand the O-ring 12. This can be significant on stiffer O-rings 12.

It is to be appreciated that O-rings 12 can only be stretched a limited amount before they are damaged. This puts constraints on the geometry of the sleeve piston 60. The inside diameter of the sleeve piston 60 must be large enough to clear the destination part, but the outside diameter must be kept small to avoid damaging the O-ring 12. These constraints result in a thin walled sleeve piston 66. This thin and delicate wall 66 must be protected, and proper alignment of the destination part, under the inserter, must be ensured to prevent crushing of the part 14. If the sleeve piston 60 is damaged, it must be replaced.

The taper of the piston housing 40 may match both the taper of the nose piston 80 and the taper inside the four jaw device 20, or each taper or slope may be substantially different. This allows for use in different O-ring handling applications. There can be a slight misalignment between the housing taper and the nose piston 80. The imaginary cones formed by each device should not share the same vertex, but rather the housing vertex could be slightly higher than the vertex of the nose piston 80. This will allow the housing 40 to enter the expanded jaws of the four jawed device 20 without catching on its edges. As thicker O-rings 12 are inserted, the geometry of the housing 40 should be modified accordingly. A "trap groove" on the sleeve piston 60 should be enlarged to support and carry the O-ring 12 through the four jawed device 20. This can also be accomplished by shortening the housing 40.

Figure 9:
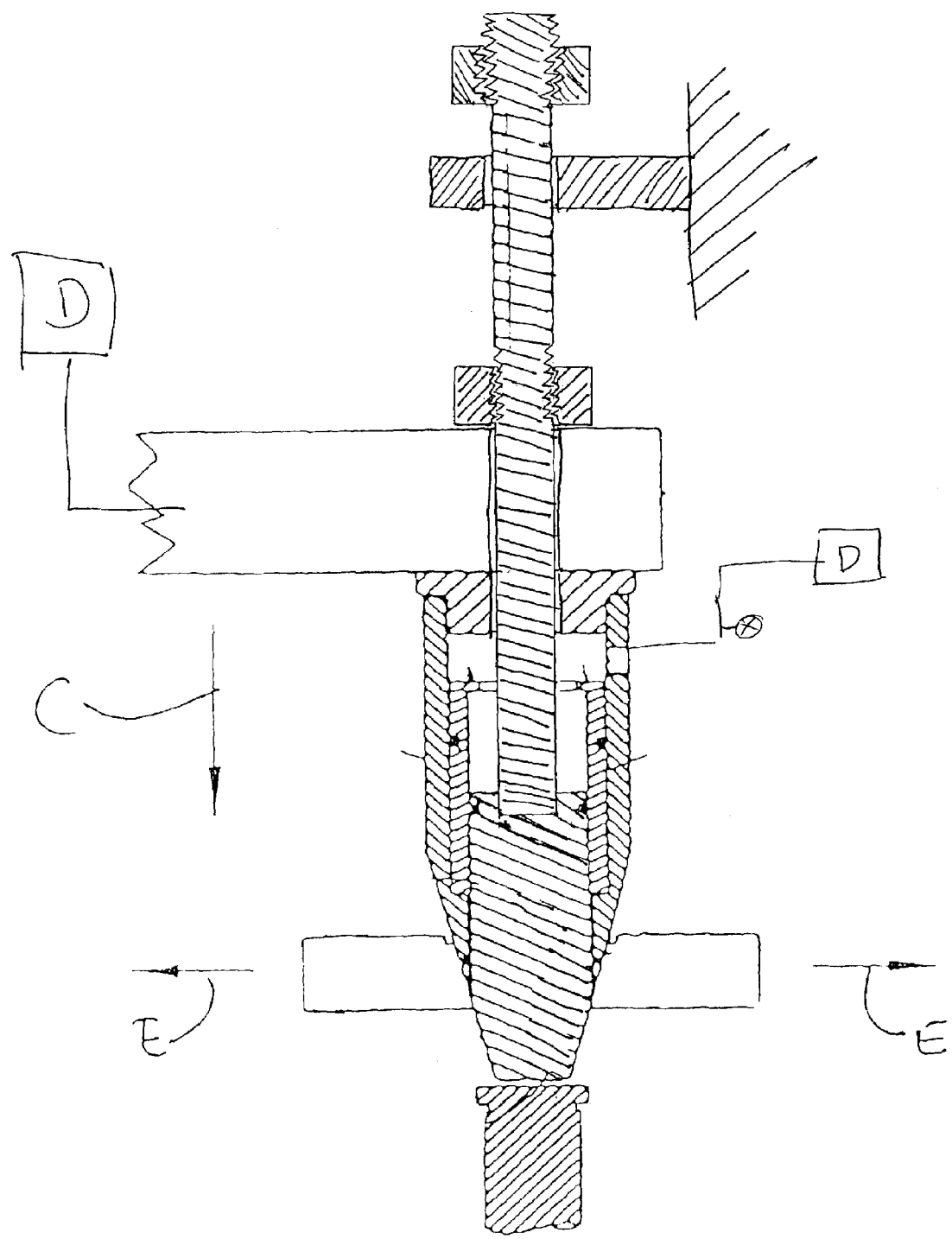
FIG. 9 shows a second embodiment of the present invention detailing another stop rod mechanism.

In another embodiment of the present invention as shown in FIG. 9, the hollow stop shaft 98 and stop rod 94 may be replaced by a solid stop shaft 198. The solid stop shaft 198 is slidably movable through the hole 102 and through the actuator arm 90. The end of the solid stop rod 198 is fixed to the nose piston 80. A first stop collar 104 is threadably supported at the free end of the rod 198, and a second stop collar 106 is threadably supported along the solid stop shaft between the fixed arm 100 and the actuator arm 90 so as to be axially adjustable along the stop shaft 198. The first stop collar 104 generally controls the allowable downward travel of the nose piston 80 relative to the fixed arm 100 and the part 14, while the second stop collar generally controls the allowable downward travel of the nose piston 80 relative to the actuator arm 90 and the piston housing 40 of the insertion device 30.

The described device may be operated in any orientation. The O-ring 12 may be retained in the four jawed device 20 by changing the counterbore to a slot so that the O-ring 12 may enter the four jawed device 20 from the side.

The action of the pressurized air may be replaced by any other type of spring or biasing system 25 that fits within the configuration of the system.

Since certain changes may be made in the above described improved O-ring application device, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I claim:

1. An O-ring insertion device for applying an O-ring to a part, the O-ring device comprising:

a piston having an O-ring engagement portion;

an O-ring holder having a piston insertion hole therethrough;

a part holder for holding the part spaced from the O-ring holder;

the piston drives the O-ring engagement portion from an initial position through the piston insertion hole and into close proximity with the part defining a space between the part and the piston so that the piston and the O-ring engagement portion do not contact the part, and returns the piston and the O-ring engagement portion to the initial position;

the piston further comprises an intermediate cylinder having a thin walled portion which in cooperation with the O-ring engagement portion is driven through the piston insertion hole to engage an O-ring supported by the O-ring holder concentric with the piston insertion hole;

a piston housing containing the intermediate cylinder and O-ring engagement portion and the piston housing in cooperation with the thin walled portion of the intermediate cylinder applies the O-ring to a part supported on the part holder; and a drive device for driving the piston through the piston insertion hole in the O-ring holder and a pressure device for slidably displacing the intermediate cylinder and the O-ring engagement portion relative to the piston housing.

2. The O-ring insertion device as set forth in claim 1 wherein the piston insertion hole is expandable to permit passage of the O-ring engagement portion therethrough.

3. The O-ring insertion device as set forth in claim 2 wherein the O-ring holder comprises at least a first portion and a second portion, each portion defining a separable circumferential segment of the piston insertion hole.

4. The O-ring insertion device as set forth in claim 3 wherein the at least first portion and second portion of the O-ring holder are inwardly biased to define the piston insertion hole and permit outward separation of the separable circumferential segments upon insertion of the O-ring engagement portion.

5. The O-ring insertion device as set forth in claim 1 wherein the piston engages an O-ring supported by the O-ring holder and applies the O-ring to a desired part supported by the part holder in a single linear motion.

6. The O-ring insertion device as set forth in claim 5 wherein the piston is returned to the initial position in a second single linear motion.

7. A device for applying an expandable member to a part, the device comprising:

a housing;

a piston slidably positioned within the housing;

a sleeve slidably interposed between the housing and the piston;

the piston having a surface to facilitate transfer of the expandable member onto an outer surface of the sleeve; and wherein, when the piston and the sleeve are sufficiently retracted inside the housing, the housing forces the expandable member off the sleeve and onto the part; and an expandable member holder defining an expandable hole therethrough to facilitate the engagement of the expandable member by a sloped engagement portion of the piston and application of the expandable member onto the outer surface of the sleeve.

8. The expandable member application device as set forth in claim 7, the device further comprising a first position wherein the piston and the sleeve are at least partially extended from an opening in the housing to facilitate engagement of the expandable member, a second position where the piston is retracted within the sleeve, and a third position where the sleeve is retracted within the housing to apply the expandable member to the part.

9. The expandable member application device as set forth in claim 7 further comprising a support portion of the expandable member holder supporting the expandable member in axial alignment with the piston.

10. The expandable member application device as set forth in claim 9 wherein the expandable member holder comprises a plurality of inwardly biased sections, each section defining a portion of the expandable hole and the hole is expandable to an extent necessary to permit passage of the piston, the sleeve, the housing and the expandable member therethrough.

11. The expandable member application device as set forth in claim 7 wherein the piston, the housing and the sleeve move between the first, second and third position in a first linear motion, and the piston, the housing and the sleeve are returned to the first position in a second linear motion axially opposite to the first.

12. The expandable member application device as set forth in claim 11 further comprising a first linear control to adjustably regulate axial motion of the piston relative to a fixed stop and a second linear control to adjustably regulate axial motion of the piston relative to the housing in the first linear motion.

13. The expandable member application device as set forth in claim 12 wherein the housing is axially moveable relative to the first and second linear controls by a first drive device and the sleeve and piston are moveable relative to the housing according to a second drive device.

14. A method of applying an expandable member to a part, the method comprising the steps of:
   slidably positioning a piston within a housing;
   interposing a slidable sleeve between the housing and the piston;
   providing a sloped expandable member engagement portion on the piston;
   transferring the expandable member from a holder to an outer surface of the sleeve by first engaging the sloped engagement portion of the piston with the expandable member in the holder, and then driving the sloped portion through an expandable hole in the holder such that the expandable hole expands and the expandable member passes through the expanding hole and is transferred onto the outer surface of the sleeve;
   positioning the sleeve into close proximity about the part defining a space between the part, the sleeve and the piston so that neither the sleeve nor the piston contact the part; and
   moving the housing relative to the sleeve to transfer the expandable member from the sleeve directly onto the part.

\* \* \* \* \*